United States Patent [19]

Jabusch et al.

[11] Patent Number: 4,890,253

[45] Date of Patent: Dec. 26, 1989

[54] PREDETERMINATION OF RESULT CONDITIONS OF DECIMAL OPERATIONS

[75] Inventors: John D. Jabusch, Endwell; Linda A. Kovacs; Timothy G. Plzak, both of Endicott; Robert R. Richardson, Vestal, all of N.Y.

[73] Assignee: International Business Machines Corporation, Armonk, N.Y.

[21] Appl. No.: 291,556

[22] Filed: Dec. 28, 1988

[51] Int. Cl.⁴ ............................................. G06F 15/00
[52] U.S. Cl. ................................................. 364/736.5
[58] Field of Search ............... 364/715.01, 736, 736.5, 364/200 MS File, 900 MS File, 748, 754, 757, 761, 768

[56] References Cited

U.S. PATENT DOCUMENTS

| | | | |
|---|---|---|---|
| 4,086,474 | 4/1978 | Negi et al. | 364/757 |
| 4,229,801 | 10/1980 | Whipple | 364/748 |
| 4,288,850 | 9/1981 | Kindell et al. | 364/200 |
| 4,320,464 | 3/1982 | Desmonds | 364/766 |
| 4,460,970 | 7/1984 | McClary | 364/761 |
| 4,608,660 | 8/1986 | Hasebe | 364/768 |
| 4,761,756 | 8/1988 | Lee et al. | 364/757 |
| 4,785,393 | 11/1988 | Chu et al. | 364/736 |

Primary Examiner—David L. Clark
Assistant Examiner—Long T. Nguyen
Attorney, Agent, or Firm—Baker, Maxham, Jester & Meador

[57] ABSTRACT

An apparatus is provided which tests the magnitude and sign digits of packed decimal binary numbers during performance of arithmetic operations which combine the numbers for the purpose of setting status bits used for setting condition codes, determining execution paths, setting the sign of the result and detecting invalid conditions.

5 Claims, 3 Drawing Sheets

PACKED DECIMAL NUMBER

PREDETERMINATION OF RESULT CONDITIONS OF DECIMAL OPERATIONS

BACKGROUND OF THE INVENTION

The invention is in the field of digital computers. In the invention, provision is made for determining result conditions of an on-going packed decimal ADD class operation prior to completion of the operation. The predetermined result conditions are used to indicate an exception interrupt or to select the sign of the ADD class operation result.

In modern computer architecture, arithmetic operations are performed on operands to produce results. The results are used to set condition codes which help control program branching during the execution of an instruction sequence. In the prior art, determination of the condition code awaited the outcome of an arithmetic operation. Upon termination, the operation results were inspected, and the condition code set appropriately, depending upon the results.

Recent modifications to computer architecture have resulted in the acceleration of fixed and floating point arithmetic operations by predetermination of condition codes before results are available. See, for example, U.S. patent application Ser. No. 07/157,500, filed Feb. 17, 1988, and entitled "CONDITION CODE PREDICTION APPARATUS". In this application, condition code predetermination is based upon manipulation of operand bits while the arithmetic operation proceeds by combining the operands.

To date, however, there has been no provision made for acceleration of result condition determination during arithmetic operations involving packed decimal numbers. This omission can be largely attributed to the complexity of packed decimal arithmetic circuitry and programming. Therefore, a clear need exists to accelerate result condition determination while packed decimal arithmetic operations are being conducted.

OBJECTS AND SUMMARY OF THE INVENTION

The primary objective of this invention is to provide for acceleration of result condition determination during packed decimal arithmetic operations.

Another objective is to provide for early detection of an exception interruption based upon invalidity of packed decimal operands which are being combined by means of an ADD class arithmetic operation.

These and other objectives are realized in a computer arithmetic unit responsive to an exception-interrupted instruction string for combining two packed, signed decimal binary operands A and B to produce a result, each operand including n consecutive hexadecimal digits designated in order from zero through n−1, zero through n−2 of the consecutive hexadecimal digits of each operand representing the operand's magnitude, the remaining hexadecimal digit of each operand representing operand's sign. The invention operates to provide result conditions of the outcome of an ADD class operation which is executing by combining the operands.

This invention is an apparatus which includes a magnitude comparator connected to the arithmetic unit for logically combining bits of the magnitude digits of the operands to produce a first result condition signal indicating the comparative magnitude of the operands. A validity determination circuit logically combines bits of the magnitude digits of the operands and bits of the sign digits of the operands to produce a second result condition signal. The second result condition signal is conditioned by the validity determination circuit to cause exception interruption of the instruction stream if the bits of the magnitude digits or the bit of the sign digits indicate either of the operands is invalid.

A sign circuit is connected to the arithmetic unit for logically combining bits of the sign digits of the operands to produce a third result condition signal indicating the equivalence or non-equivalence of the signs of the operands.

Last, a result sign selector is connected to the magnitude comparator and to the sign circuit and is responsive to the first and second result condition signals for selectively providing either the sign digit of operand A or the sign digit of operand B as the sign of the result.

The achievement of the above-stated objectives by this invention will be appreciated upon a reading of the following description with reference to the below-described drawings.

DETAILED DESCRIPTION OF THE PREFERRED EMBODIMENT

In the following description, familiarity with packed decimal arithmetic instructions is assumed. For reference see Chapter 7 of IBM 370 ASSEMBLY LANGUAGE WITH ASSIST, by Charles J. Kacmar, Prentice Hall, 1988. Further, the usual meaning is assigned to the term ADD class operations. That is, an ADD class operation is an add, subtract, or compare operation which combines two signed or unsigned, packed decimal digits to produce a result. ADD class operations result from specific instructions in, for example, the IBM System/370 assembly language instruction set. See appendices B and C of the cited Kacmar reference.

Figure 1:
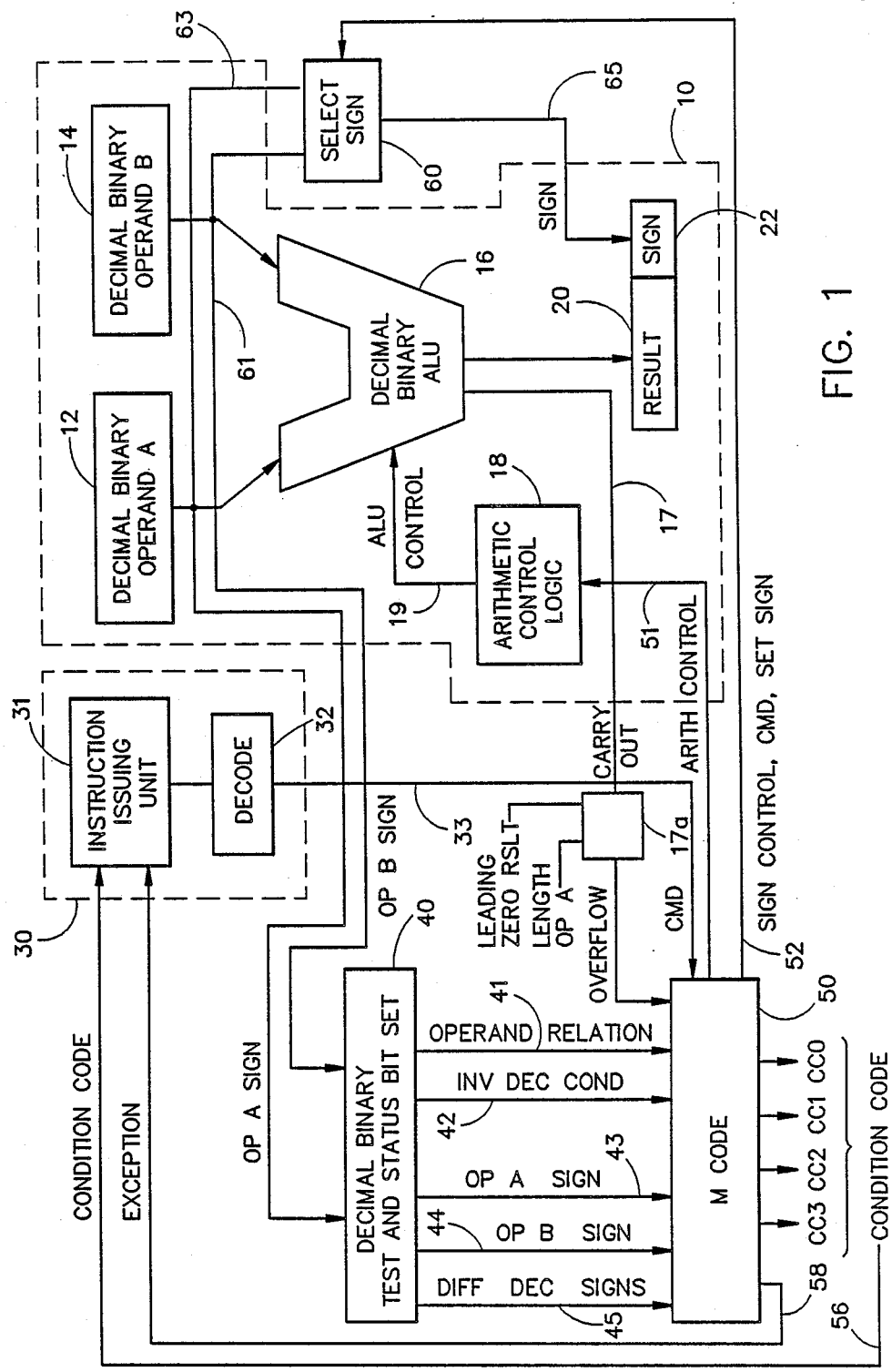
FIG. 1 is a block diagram illustrating the structure of the invention.

An apparatus for simplifying the testing of packed decimal operands to determine result conditions before ADD class arithmetic is completed is illustrated in FIG. 1, in combination with a prior art packed decimal arithmetic unit.

The invention is for the purpose of determining such result conditions and indicating the outcome of the determination by setting status bits which are used generating condition codes, determining execution paths, setting the sign of an arithmetic operation result, and detecting invalid conditions.

In FIG. 1, there is provided an arithmetic unit for performing ADD class operations on a pair of operands, operand A and operand B. The arithmetic unit is indicated by reference numeral 10 and consists of operand registers 12 and 14, respectively, for containing operands A and B. Each register feeds a binary arithmetic logic unit (ALU) 16, which is controlled by an arithmetic control logic 18 to combine operand A with operand B by an add, subtract or logical compare operation. The type of operation is indicated by the condition of an ALU control signal (ALU CONTROL) provided on signal line 19. The result of the ADD class operation performed by the ALU 16 is provided to a result register (RESULT) 20. The result is a packed decimal number which includes a sign digit (SIGN) stored in the right-hand field 22 of the register 20. An overflow condition during an add or subtract operation is determined conventionally by overflow circuit 17a in response to the location of leading zero in the result produced by the ALU 16, the length of operand A, and any carryout provided by the ALU 16 on signal line 17.

The prior art arithmetic unit 10 is controlled by a conventional prior art instruction unit 30, including an instruction issuing unit 31 and a conventional instruction decoder 32. The instruction issuing unit 31 operates conventionally to issue a sequence of instructions including plurality of execution paths defined by one or more loops or branches. The instruction issuing unit 31 also responds to an exception signal indicating invalid operating conditions. As is conventional, the instruction issuing unit 31 has provision for interrupting and suspending the instruction sequence in response to an exception signal conditioned to cause interruption.

The current instruction provided by the issuing unit 31 is decoded by the decoder 32 to provide a conventional command (CMD) on a signal line 33.

The invention includes a decimal binary test and status bit set circuit 40 which receives operands A and B in parallel with the ALU 16. The circuit 40 combines various portions of the operands as described below to produce on signal line 41, a 3-bit signal indicating a magnitude relation between operands A and B (OPERAND RELATION). On signal line 42, the circuit 40 produces an invalid decimal condition signal INV DEC COND. The circuit 40 produces a single binary digit on each of signal lines 43 and 44, indicating, respectively, the sign of operand A and the sign of operand B (OP A SIGN and OP B SIGN). Last, the circuit 40 produces a signal on signal line 45,(DIFF DEC SIGNS), which is set when operands A and B have different signs, and which is reset when the signs are the same. The signals on signal lines 41-45, together with the CMD signal on signal line 33 and the OVERFLOW signal line 17 are provided to a condition and exception code circuit 50.

The code circuit 50 is, preferably, a programmed circuit whose functions are implemented in microcode and hardware, and which is described in detail in the illustrations below. This circuit produces four condition code signals CC0, CC1, CC2, and CC3 provided on multi-conductor signal line 56 to the instruction issuing unit 31. An EXCEPTION signal is provided by the code circuit 50 on signal line 58, with connection to the instruction issuing unit 31. The code circuit 50 also produces an arithmetic control signal on signal line 51 which is provided to the arithmetic control logic 18 to indicate which of the ADD class operations is to be undertaken by the ALU 16. Last, the code circuit 50 produces and provides a SIGN CONTROL signal, the signal being provided on signal line 52 to a select sign circuit 60.

Finally, the invention consists of the select sign circuit 60 which receives the SIGN CONTROL signal on signal line 52 and also the sign digits of operands A and B on signal lines 61 and 63, respectively, to select and provide as the sign of the result, one of the operand signs. The selected sign (SIGN) is provided on signal line 65 to the SIGN portion 22 of the register 20. The select sign circuit is preferably included as part of the code circuit 50, however h is shown separately in FIG. 1 as an aid in understanding the invention.

Figure 2:
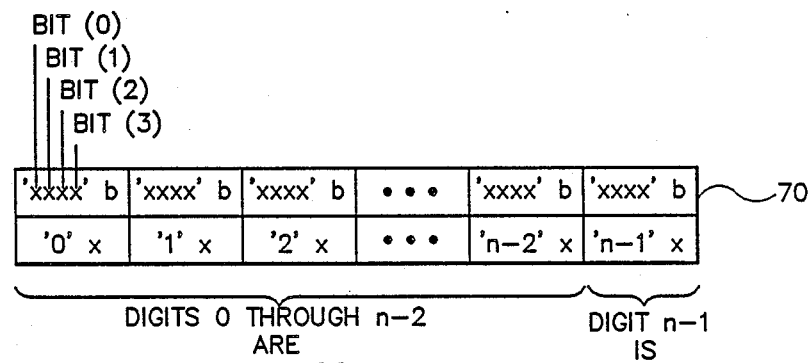
FIG. 2 is a representation of a packed decimal binary number having n digits.

Refer now to FIG. 2 for an understanding of a packed decimal number 70 which consists of n digits. When presented to the arithmetic unit 10 of FIG. 1, an operand in the packed decimal form of FIG. 2 includes n consecutive four-bit groups. Each of these groups is indicated by the binary notation 'xxxx'b where each of the x's indicates the place of a binary digit (bit). The bits making up each four-bit group are numbered from bit (0) through bit (3) in order of decreasing magnitude, as shown in FIG. 2 for the first bit group. Each of the n−1 bit groups of the number 70 is represented conventionally by a hexadecimal digit 'i' X, where $0 \leq i \leq n-1$. As is conventional, n−1 of the hexadecimal digits represent the absolute magnitude of the packed decimal 70, while the (n)th digit represents the number's sign.

Figure 3:
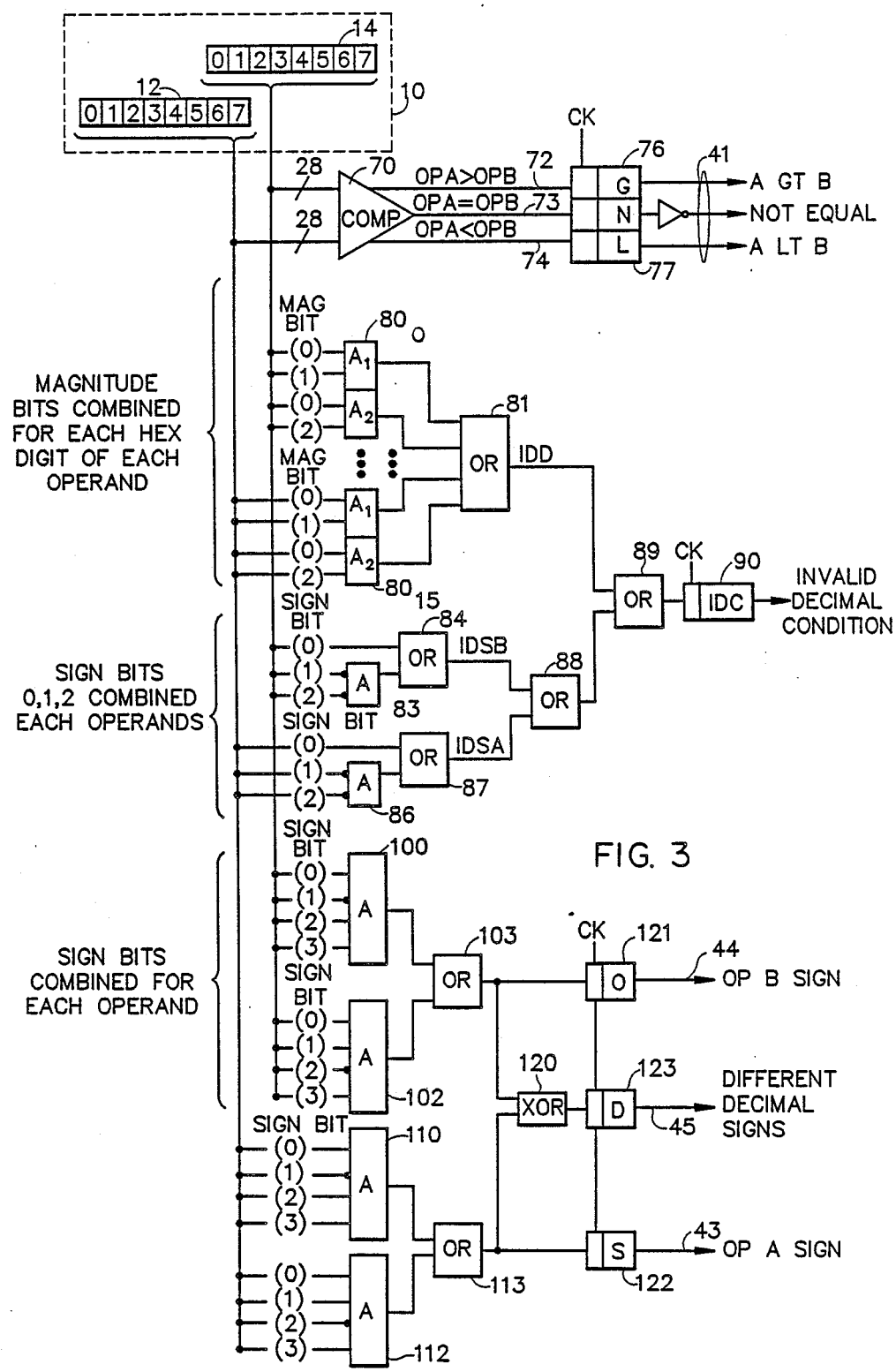
FIG. 3 is a circuit diagram illustrating the decimal binary circuit of FIG. 1.

FIG. 3 illustrates details of the decimal binary test and status bit set circuit 40, interconnected with the operand registers 12 and 14 of the arithmetic unit 10. In FIG. 3 and in the description which follows, it is assumed that the operands are both 8-digit, signed packed decimal numbers with the magnitude digits zero through 6 and sign digit numbered 7. Resultantly, each number consists of 32 binary digits,(bits). Each of the hexadecimal digits has 4 bits, numbered 0 through 3. The circuit 40 can process any size of decimal operand, with the assumption that operands greater than 8 digits have more magnitude digits, but still only one sign digit.

In FIG. 3, a conventional digital comparator 70 receives and compares 28 bits representing the 7 magnitude digits of each of the operands A and B. The comparator 70 provides 3 signals indicating the result of this comparison, the first signal indicating that operand A is greater than operand B, the second that the 2 operands are equal, and the third that operand A is less than operand B. These 3 signals are provided, respectively, on signal lines 72, 73 and 74 to a three-cell latch 76. The cells of latch 76 are clocked by a clock signal (CK) to capture the output of the comparator 70. The first latch cell is denoted as G. When set, the output of this latch indicates that the magnitude of operand A is greater than the magnitude of operand B (A GT B). The cell denoted as L indicates the opposite: that is, that operand A is less than (LT) operand B. The output of the cell denoted as N feeds an inverter 77, the inverter 77 produces a signal NOT EQUAL which if set to a conventional digital value of "1", indicates that the magnitudes of the operands are unequal. Otherwise, if conditioned to a value of binary "zero", the NOT EQUAL signal indicates equality of the operands. Together, the outputs of the G and L latches and the inverter 77 form the 3-conductor signal line 41 of FIG. 1. For operands greater than eight digits, the higher-order digits are considered unsigned (magnitude only) and are processed by the comparator in the order high-to-low. The NOT EQUAL, GREATER THAN, and LESS THAN signals are cumulative; GREATER THAN and LESS THAN may be set only if the previous state of not equal was "0", and not equal must be set at the same time.

Next, an invalid decimal digit (ID) circuit includes 14 dual AND circuits, each dual AND circuit 80 having two inputs and a single output. The outputs of the AND circuits 80 are collected by an OR gate 81. To understand the function of each of the AND gates consider that each hexadecimal magnitude digit includes 4 binary bits. The valid content of each of these digits is a magnitude value represented by one of the whole numbers in the range 0 through 9, which is given as '0000' b through '1001' b. All other possible values are invalid.

Given that each hexadecimal magnitude digit bit is numbered (0) through (3) from left to right, it will be appreciated that the occurrence of binary '11' in bit positions (0) and (1) or in bit positions (0) and (2) will reveal the existence of an invalid decimal digit having one of the values given in Table I.

TABLE I

| DIGIT BIT POSITION | | | | MAGNITUDE | SIGN |
|---|---|---|---|---|---|
| (0) | (1) | (2) | (3) | DIGIT VALUE | POLARITY |
| 0 | 0 | 0 | 0 | '0' | invalid |
| 0 | 0 | 0 | 1 | '1' | invalid |
| 0 | 0 | 1 | 0 | '2' | invalid |
| 0 | 0 | 1 | 1 | '3' | invalid |
| 0 | 1 | 0 | 0 | '4' | invalid |
| 0 | 1 | 0 | 1 | '5' | invalid |
| 0 | 1 | 1 | 0 | '6' | invalid |
| 0 | 1 | 1 | 1 | '7' | invalid |
| 1 | 0 | 0 | 0 | '8' | invalid |
| 1 | 0 | 0 | 1 | '9' | invalid |
| 1 | 0 | 1 | 0 | invalid | positive |
| 1 | 0 | 1 | 1 | invalid | negative |
| 1 | 1 | 0 | 0 | invalid | positive |
| 1 | 1 | 0 | 1 | invalid | negative |
| 1 | 1 | 1 | 0 | invalid | positive |
| 1 | 1 | 1 | 1 | invalid | positive |

Table I illustrates the six possible invalid bit configurations for a packed decimal magnitude bit. It will be appreciated that each of the dual AND gates $80_0$ through $80_{15}$ tests for every one of the five possible invalid bit patterns, each gate pair testing a respective one of the possible 16 magnitude digits included in the two operands. For example, two AND gates are included in dual gate $80_0$. The first gate $A_1$ of gate pair $80_0$ tests bits (0) and (1) of magnitude digit '0' in operand B; gate $A_2$ tests bits (0) and (2). If the bit pattern for the first digit of operand B has the value in Table I corresponding to 'B' X, operand B will be invalid, which would be indicated by a positive output from gate $A_2$ of gate pair $80_1$. It is understood that the circuit illustrated by FIG. 3 also includes gate pairs $80_1$–$80_7$ for testing digits 1 through 7 of operand B. Further, the circuit includes 8 dual AND gates, including gate pair $80_{15}$, for testing the magnitude digits of operand A. For operands greater than eight digits, the higher-order digits are considered (magnitude only) and all eight operand digits are tested for invalid magnitude digit bit combinations. The outputs of all of the AND gates in the dual AND gates $80_0$ through $80_{15}$ are collected in the OR gate 81, whose output will rise whenever any of the magnitude digits of operand A or operand B is invalid.

The sign digits of the operands are tested in a pair of invalid decimal sign (IDS) circuits. The circuit for detecting an invalid sign for operand B includes an AND gate 83 with two inverting inputs and an OR gate 84 having a positive input connected to the output of the AND gate 83 and an inverting input which receives sign digit bit (0). Invalidity detection of the operand A sign digit is made by a combination of the AND gate 86 and the OR gate 87, which are configured and connected in the same manner as the gates 83 and 84.

Reference to Table I will also support an understanding of the operations of the invalid decimal sign circuits. In packed decimal arithmetic, the sign digits (the digits enumerated as 7 in this specific example) are constrained not to have the values listed as invalid in Table I. The patterns of Table I are detected by the AND/OR gate pairs 83 and 84, and 86 and 87 for operand B and operand A, respectively. For example, assume the sign digit of operand A has the value '0010' b. In this case, the binary "0" value of sign digit (0) would be inverted at the inverting input of the OR gate 87. As a result, the output of the OR gate 87 will rise indicating an invalid decimal sign for operand A (IDSA).

The outputs of the OR gates 84 and 87 are collected in OR gate 88. The outputs of OR gates 81 and 88 feed the inputs of the OR gate 89, whose output is connected to the input of an invalid decimal condition (IDC) latch 90. Thus, the presence of an invalid decimal digit (IDD), signified by a positive output from the OR gate 81, or an invalid decimal sign (IDS B or IDS A) indicated by a positive output from the OR gate 88, will be fed through the OR gate 89 to set the IDC latch 90. The latch 90 is clocked and its positive output, when set, provides INV DECIMAL COND signal on signal line 42.

The last function performed by the decimal binary test and status set logic 40 is the detection of the signs of operands A and B, as well as production of the DIFFERENT DECIMAL SIGNS signal. The signs of the operands are given, in this embodiment, by the values of their sign digits, digit number 7 in each case. The sign polarity convention for packed decimal numbers is indicated by Table I. Table I, in addition to indicating invalid values for magnitude digits, lists all of the possible valid value codes for the sign digits of operands A and B. In Table I, 2 hexadecimal codes are assigned negative polarity, the remaining 4, positive polarity. For operand B, the negative polarity codes 'B' X and 'D' X are respectively detected by AND gates 100 and 102. Similarly, for operand A, AND gates 110 and 112 detect 'B' X and 'D' X, respectively. For operand B, detection of a negative sign is indicated by a rise in the output of the OR gate 103, which receives as inputs the outputs of the AND gates 100 and 102. Similarly, the OR gate 113 indicates the presence of a negative sign for operand A. When a negative sign is detected for operand B, the output of the latch 121 rises to a value (digital) of "1"; when the sign is positive, the latch is reset.

The OR gates 103 and 113 also feed an exclusive-OR (XOR) gate 120. When the signs of the operands are the same, the output of the XOR gate causes the DIFFERENT DECIMAL SIGNS signal output by the latch 123 to be inactive. When the signs differ, the output of the latch rises, indicating opposite signs.

The structure and operation of the code circuit 50 is illustrated in Table III. Table III provides a pseudocode listing of the logic embodied in the code circuit for converting the result condition signals produced by the circuit 40 into an EXCEPTION signal and for selecting the sign of the result to be produced by combining operands A and B by an ADD operation.

Initially, the operands A and B are fetched to the registers 12 and 14. When this occurs, the circuit 40 combines the magnitude and operand bits to produce the output signals described above. Once the latches G, N, L, IDC, O, D, and S have captured their inputs, they condition the signals on signal lines 41 through 45. These signals are fed to the code circuit 50 for use in steps (2)–(23) of the pseudocode procedure of Table II.

TABLE II (1)  Fetch Operands
(2)  Test operands to determine relative magnitude [G,N,L] equivalence [D] and value of sign [OS], validity of data [IDC]
(3)  IF data is valid THEN
(4)  SET condition code based upon signs and relative

TABLE II-continued

|   |   |
|---|---|
| | magnitude |
| (5) | IF "Compare" THEN |
| (6) | Exit |
| (7) | ELSE |
| (8) | IF ("Add" and signs are equivalent [D] OR ("Subtract" and signs are opposite [D]) THEN |
| (9) | Add operand magnitudes |
| (10) | Set result sign = operand A sign [S] |
| (11) | Store result |
| (12) | IF overflow THEN |
| (13) | Set CC3 |
| (14) | Return exception code |
| (15) | ENDIF |
| (16) | ELSE |
| (17) | IF operand magnitudes are equal, THEN |
| (18) | operand = +0 |
| (19) | ELSE |
| (20) | Subtract smaller operand from larger [G,L] |
| (21) | Set sign equivalent to sign of larger operand [G, L, O, S] |
| (22) | ENDIF |
| (23) | Store result |
| (24) | ENDIF |

In steps (2) through (23), the code circuit 50 receives a CMD signal indicating the type of operation being conducted; it also receives the signals on lines 41 through 45 that are generated by the circuit 40, and conducts the process in reaction to the CMD signal and the values of those signs, as illustrated in Table I. Initially, in step (2) the test is for validity (IDC). If IDC is set, the procedure of Table III returns an exception code in step (22). Otherwise, the condition code is set. The procedure is exited in step (5) if the command indicated on line 33 is a COMPARE operation. Otherwise, if the CMD indicates an ADD and the signs of the operands are equivalent (D is reset), or if the operation is a SUBTRACT and the signs are opposite (D is set) then an ARITH CONTROL signal is provided in the arithmetic unit 10, which causes the ALU 16 to add the operand magnitudes. The result sign is selected by the select sign circuit 60 and entered into the sign field 22 of the result register.20. Following this, the result is stored. Now, if an overflow is detected in step (11), the condition code is changed to CC3 and an exception code is returned to interrupt the instruction sequence. Steps (15), (16), and (17) are executed if the test of step (7) fails. Here, the smaller operand is subtracted from the larger and the result sign is made equivalent to the sign of the larger operand.

Figure 4:
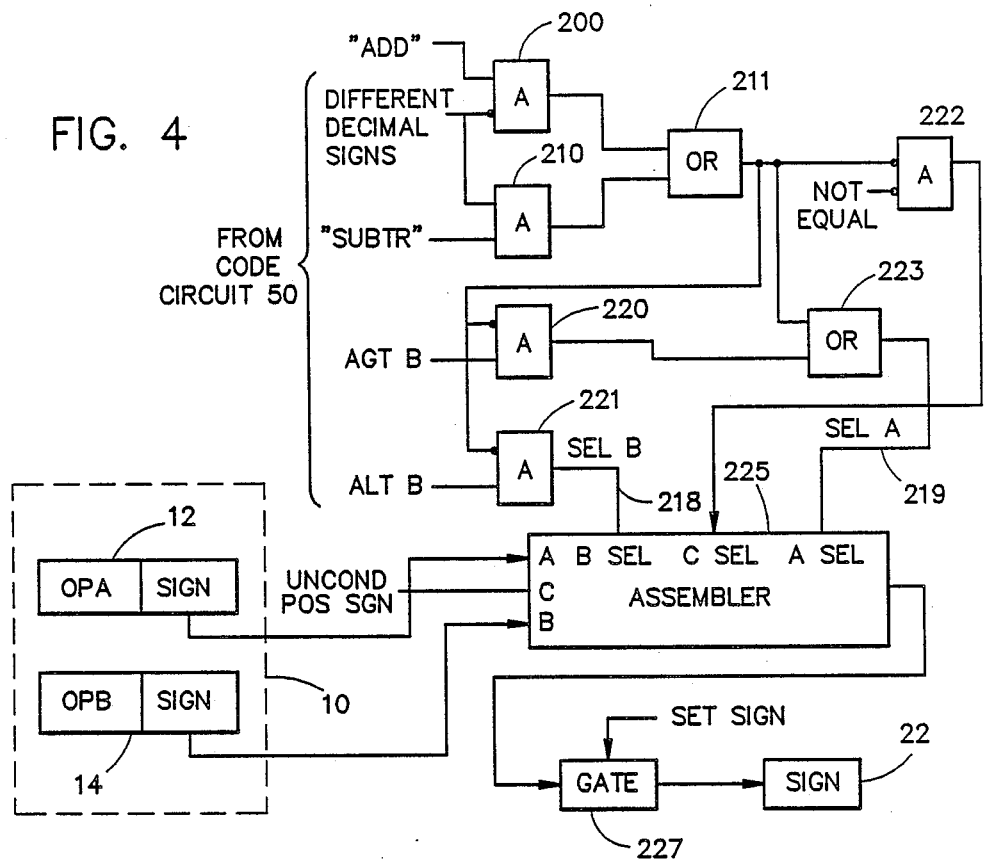
FIG. 4 illustrates a sign selection circuit of FIG. 1.

Sign selection is understood with reference to FIG. 4. FIG. 4 is a more detailed illustration of the select sign circuit 60. The select sign circuit 60 on signal path 52 receives the DIFFERENT DECIMAL SIGNS, A GT B, and A LT B signs from the code circuit 50. In addition, the code circuit 50 provides a signal ADD or a signal SUBTR denoting respectively an add or subtract operation. The gates 200, 210 and 211 perform the test of procedure step (7) in Table III. In this regard, if the operation is an add operation and the operand signs are equivalent (DIFFERENT DECIMAL SIGNS reset) the output of the AND gate 200 rises. Otherwise, if the operation is a subtract and the signs are equivalent the output of the AND gate 210 rises. The outputs of the AND gates 200 and 210 are fed to an OR gate 211. Thus, if either of the conditions of step (7) of the Table III procedure is satisfied, the output of the OR gate 211 rises. On the other hand, if the conditions of step (7) are not satisfied, the logic "0" output of the OR gate 211 is inverted into each of the AND gates 220 and 221. For gate 220, the A GT B signal is provided, denoting that the magnitude of operand A is greater than the magnitude of operand B. In this case, assuming a "0" output for the OR gate 211, the output of the AND gate 220 will rise. The output of the AND gate 220 and the output of the OR gate 211 are fed to the inputs of the OR gate 223. The OR gate 223 provides a signal on signal line 219 to select the sign of operand A (SEL A). Alternatively, if the output of the OR gate 211 is at "0" level and the magnitude of operand B is larger than the magnitude of operand A, the output of the AND gate 221 rises, providing a signal on line 218 to select the sign of operand B (SEL B).

The AND gate 222, when activated, indicates that the result is to be unconditionally signed positive. In this regard, when the output of the OR gate 211 is reset, and the operands are equal, the result will have a magnitude of zero. When its magnitude is zero, the result's sign is set unconditionally positive.

The outputs of the gates 223, 221 and 222 are provided, respectively, to the select A, select B and select C inputs of an assembler/multiplexor 225. Also provided to the A and B inputs of the assembler/multiplexor 225 are the sign digits of operand A and operand B, respectively, from the registers 12 and 14. Thus, when the SEL A signal is high, the sign of operand A is selected by the assembler/multiplexer 225 and provided to a gate 227. Gate 227 is activated by a signal (SET sign) generated by the code circuit 50 when steps (9) and (16) are executed. The result is the SET SIGN signal which activates the gate, permitting the sign of the selected operand to be entered into the sign field 22 of the register 20.

Execution of step 4 of the procedure of Table II is done by the code circuit according to the equations given below.

When an ADD operation is conducted, the equations for setting the System/370 condition codes are given by:

$$SETCC0 = NDV \qquad (1)$$

$$SETCC1 = NDOVG + NDOVL + DOV \qquad (2)$$

$$SETCC2 = NDOVG + NDOVL + DOV \qquad (3)$$

$$SETCC3 = V \qquad (4)$$

For the SUBTRACT operation, the equation for setting IBM System/370 condition codes are given by:

$$SETCC0 = NDV \qquad (5)$$

$$SETCC1 = NDOVG + NDOVL + DOV \qquad (6)$$

$$SETCC2 = NDOVG + NDOVL + DOV \qquad (7)$$

$$SETCC3 = V \qquad (8)$$

Where:
 N=Not Equal
 D=Different Decimal Signs
 O=OPB SIGN
 L=A LT B
 G=A GT B
 V=Decimal Overflow Obviously, many modifications and variations of the present invention are possible in light of the above teachings. It is, therefore, to be understood that within the scope of the appended claims, the invention may be practiced other than as specifically described. What is claimed is:

We claim:

1. In a computer arithmetic unit responsive to an exception-interrupted, branched instruction stream for combining two packed, signed, decimal binary operands, A and B, to produce a packed, signed, decimal binary result, each operand including n hexadecimal digits, each of the hexadecimal digits having a plurality of bits, n−1 of the hexadecimal digits of each operand representing the operand's magnitude, 1 hexadecimal digit of each operand representing the operand's sign, said computer arithmetic unit including an instruction issuing unit which interrupts said instruction stream in response to an exception interruption, a result condition status apparatus for indicating result conditions of the outcome of an " ADD" class operation combining said operands, said apparatus comprising:
 comparative magnitude means connected to said arithmetic unit for logically combining bits of the magnitude digits of said operands to produce a first result condition signal indicating the comparative magnitude of said operands;
 validity determining means connected to said arithmetic unit and to said instruction issuing unit for logically combining bits of the magnitude digits and bits of the sign digits of said operands to produce a second result condition signal, said second result signal being provided to said instruction issuing unit, said second result condition signal conditioned by said validity determining means to cause exception interruption of said instruction stream if said bits of the magnitude digits or said bits of the sign digits indicate either of said operands is invalid;
 signs means connected to said arithmetic unit for logically combining bits of the sign digits of said operands to produce a third result condition signal indicating the equivalence or non-equivalence of the signs of said operands; and
 result sign selection means connected to said comparative magnitude means and to said sign means and responsive to said first and third result condition signals for selectively providing either the sign digit of operand A or the sign digit of operand B as the sign of said result.

2. The result condition status apparatus of claim 1, wherein said instruction issuing unit branches said instruction stream in response to a condition indication, said result condition status appartus further comprising condition code logic connected to said comparative magnitude means, to said sign means, and to said instruction issuing unit for logically combining said first and third result condition signals to produce a condition code signal, said condition code signal being provided to said instruction issuing unit, said condition code signal conditioned by said condition code logic to cause branching of said instruction stream if said operands are unequal in magnitude and sign.

3. In a computer arithmetic unit responsive to an exception-interrupted, branched instruction stream for combining two packed, signed, decimal binary operands, A and B, to produce a packed, signed, decimal binary result, each operand including n hexadecimal digits, each hexadecimal digit having four bits, n−1 of the hexadecimal digits of each operand representing the operand's magnitude, 1 hexadecimal digit of each operand representing the operand's sign, said computer arithmetic unit including an instruction issuing unit which interrupts said instruction stream in response to an exception interruption, a result condition status apparatus for indicating result conditions of the outcome of an " ADD" class operation combining said operands, said apparatus comprising:
 a magnitude comparator connected to said arithmetic unit for combining magnitude bits of said operands to produce a first binary signal indicating a magnitude binary order of said operands and a second binary signal indicating magnitude equality of said operands;
 a sign comparator connected to said arithmetic unit for combining sign bits of said operands to produce a third binary signal indicating sign inequality of said operands; and
 a sign selection circuit connected to said magnitude comparator and to said sign comparator for selectively providing the sign digit of one of said operands as the sign of said result in response to said first, second, and third binary signals.

4. The apparatus of claim 3, further including:
 an operand magnitude validity comparator for testing selected bits of each of said n−1 of the hexadecimal digits of each of said operands to produce a binary magnitude digit signal conditioned to indicate that a magnitude digit of either of said operands has a value not represented by a whole number in the range 0 through 9;
 an operand sign validity comparator for testing selected bits of the sign digit of each of said operands to produce a binary sign digit signal conditioned to indicate that the sign digit of either of said operands has a value represnted by a whole number in the range 0 through 9;
 a gate connected to said operand magnitude and operand sign validity comparators for combining said binary magnitude and binary sign digit signals to produce a binary invalid decimal condition signal conditioned to indicate invalidity of either of said operands; and
 means connected to said instruction issuing unit and to said gate for providing an exception signal to said instruction issuing unit in response to a condition of said binary invalid decimal condition signal which indicates invalidity of either of said operands.

5. The apparatus of claim 4 wherein said instruction issuing unit branches said instruction stream in response to a condition indication, said means further comprising condition code logic connected to said magnitude comparator, to said said sign comparator, and to said instruction issuing unit, for combining said first, second, and third binary signals to produce a condition code signal, said condition code signal being provided to said instruction issuing unit, said condition code signal conditioned by said condition code logic to cause branching of said instruction stream if said operands are unequal in magnitude and sign.

* * * * *